US008732798B2

(12) United States Patent
Kim et al.

(10) Patent No.: US 8,732,798 B2
(45) Date of Patent: May 20, 2014

(54) AUTOMATIC DISABLING OF ENABLED CONNECTION PROFILE FOR WIRELESS NETWORK

(75) Inventors: Ethan Kwang-Soo Kim, Apex, NC (US); Andrey Leonov, Thornhill (CA)

(73) Assignee: BlackBerry Limited, Waterloo (CA)

( * ) Notice: Subject to any disclaimer, the term of this patent is extended or adjusted under 35 U.S.C. 154(b) by 306 days.

(21) Appl. No.: 13/197,524

(22) Filed: Aug. 3, 2011

(65) Prior Publication Data
US 2013/0036450 A1 Feb. 7, 2013

(51) Int. Cl.
G06F 7/04 (2006.01)
G06F 15/16 (2006.01)
G06F 17/30 (2006.01)
H04L 29/06 (2006.01)
G06F 15/173 (2006.01)

(52) U.S. Cl.
USPC .............................. 726/3; 709/225

(58) Field of Classification Search
USPC .............................. 726/3; 709/225
See application file for complete search history.

(56) References Cited

U.S. PATENT DOCUMENTS

| 7,609,650 | B2 * | 10/2009 | Roskowski et al. ........... 370/252 |
| 8,055,249 | B2 * | 11/2011 | Pourtier et al. ............... 455/418 |
| 8,612,582 | B2 * | 12/2013 | Dare et al. .................... 709/224 |
| 8,615,581 | B2 * | 12/2013 | Dare et al. .................... 709/224 |
| 2002/0071436 | A1 * | 6/2002 | Border et al. ............. 370/395.32 |
| 2005/0260989 | A1 * | 11/2005 | Pourtier et al. ............. 455/435.3 |
| 2006/0007870 | A1 * | 1/2006 | Roskowski et al. ........... 370/252 |
| 2008/0147882 | A1 | 6/2008 | Reif et al. |
| 2008/0181187 | A1 * | 7/2008 | Scott et al. .................... 370/338 |
| 2008/0281952 | A1 * | 11/2008 | Fedotenko .................... 709/223 |
| 2009/0245176 | A1 | 10/2009 | Balasubramanian |
| 2010/0290362 | A1 * | 11/2010 | Croot et al. .................... 370/252 |
| 2011/0235624 | A1 * | 9/2011 | Scott et al. .................... 370/338 |
| 2011/0238824 | A1 * | 9/2011 | Scott et al. .................... 709/224 |
| 2011/0238847 | A1 * | 9/2011 | Scott et al. .................... 709/228 |

FOREIGN PATENT DOCUMENTS

| EP | 1542400 A2 | 6/2005 |
| WO | 2008061347 A1 | 5/2008 |

OTHER PUBLICATIONS

Blackberry Forums, "Limited Number of WiFi Profiles" thread on BlackBerry Forums Support Community, posted online Feb. 13, 2011, retrieved Jun. 24, 2011.
Extended European Search Report mailed Jan. 18, 2012. In corresponding European application No. 11176482.5.

* cited by examiner

*Primary Examiner* — Carolyn B Kosowski
(74) *Attorney, Agent, or Firm* — Novak Druce Connolly Bove + Quigg LLP

(57) ABSTRACT

To reduce automatically a number of enabled connection profiles in a mobile station, for example, while the number of enabled connection profiles is at its maximum, a mobile station automatically selects one of the existing enabled connection profiles to disable and automatically disables the auto-selected connection profile.

20 Claims, 15 Drawing Sheets

AUTOMATIC DISABLING OF ENABLED CONNECTION PROFILE FOR WIRELESS NETWORK

BACKGROUND

For ease of illustration, the various techniques disclosed in this document are discussed in the context of IEEE 802.11-based wireless network. This context is described in the IEEE 802.11 specifications for wireless local area network (WLAN) media access control (MAC) and physical layer (PHY). However, those of ordinary skill in the art, using the teachings provided in this document, may implement the disclosed techniques in other wireless networks. Accordingly, references to techniques and components specific to IEEE 802.11 apply also to the equivalent techniques or components in other wireless network standards unless otherwise noted.

A mobile station may store in its memory one or more connection profiles. Each connection profile includes a network name, which in IEEE 802.11 is known as a service-set identifier (SSID). The network name uniquely identifies the connection profile in the mobile station, so that no two connection profiles stored in the same mobile station include the same network name. If the mobile station is capable of operating in more than one mode/frequency band, a connection profile may include an indication of the mode in which the network operates. For example, in IEEE 802.11, the mode may be IEEE 802.11a, which operates in the 5 GHz band, or IEEE 802.11b/g, which operates in the 2.4 GHz band.

A connection profile is optionally labeled with a profile label. A connection profile may include indications of other network details, for example, one or more of the following: a security type, a security subtype, an authentication method, and an encryption type. A connection profile may also include credentials for use with the implemented security type or with the authentication method or with both. A non-exhaustive list of examples of credentials includes a passphrase, a username, a password, an IMSI (International Mobile Subscriber Identity), a certificate, and a certificate having an expiry date.

A connection profile may be created using user-interface components of the mobile station or using Wi-Fi Protection Setup™ (WPS) techniques, and such a connection profile is referred to in this document as a user-created connection profile. For example, it may be sufficient to provide via the user-interface components a network name, an indication of security type, and, if applicable, a set of credentials for the indicated security type, in order to create a user-created connection profile stored in the mobile station.

Alternatively, a connection profile may be provisioned to the mobile station, and such a connection profile is referred to in this document as a provisioned connection profile. For example, a connection profile may be provisioned to the mobile station in native storage space to provide an out-of-the-box experience, or transmitted to the mobile station either over an existing WLAN connection or through an out-of-band channel, for example, a Universal Serial Bus (USB) connection or a wireless cellular network connection. The source of a provisioned connection profile may be, for example, a manufacturer of the mobile station, an Information Technology (IT) administrator of an enterprise that has purchased the mobile station, or a carrier who controls the sale of the mobile station.

As a further alternative, a connection profile may be installed in the mobile station as part of installation of a third-party application on the mobile station, and such a connection profile is referred to in this document as a third-party connection profile. For example, the source of the third-party connection profile may be the provider of the third-party application, or the third-party connection profile may have been created for the provider of the third-party application by the manufacturer or carrier of the mobile station. A connection profile may include an indication, or one or more indications that collectively indicate, whether the connection profile is a user-created connection profile or a provisioned connection profile or a third-party connection profile.

Connection profiles may be assigned priority relative to each other. The relative priority assigned to a connection profile may be determined by a user of the mobile station or by the source of a provisioned connection profile. The relative priority of connection profiles may affect the order in which those connection profiles are compared to scan results and therefore may also affect the order in which the mobile station attempts to connect to wireless networks having a network name included in those connection profiles. Connection profiles may be created with the lowest relative priority, by default.

A connection profile may be in an enabled state or in a disabled state, and a connection profile may include an indication of whether it is in the enabled state or in the disabled state. A connection profile in the enabled state, referred to in this document as an enabled connection profile, is a candidate for automatic connection attempts by the mobile station if a wireless network having the same network name as the enabled connection profile has been detected in the band indicated in the enabled connection profile with sufficient received signal strength by the mobile station. A connection profile in the disabled state, referred to in this document as a disabled connection profile, is not a candidate for automatic connection attempts by the mobile station.

Regardless of any limit on the number of connection profiles that a mobile station can store, there may be an upper limit on how many of the connection profiles stored in the mobile station can be enabled at the same time. For example, a mobile station may limit the number of enabled connection profiles to 32 or 64.

BRIEF DESCRIPTION OF THE DRAWINGS

Embodiments are illustrated by way of example and not limitation in the figures of the accompanying drawings, in which like reference numerals indicate corresponding, analogous or similar elements, and in which:

FIGS. 5-1 and 5-2 are example screenshots of the display of an example prioritized list of connection profiles stored in the mobile station;

FIGS. 11-1 and 11-2 are flowchart illustrations of alternate example methods for automatically selecting an enabled user-created connection profile to disable;

FIGS. 12-1 and 12-2 are flowchart illustrations of alternate example methods for automatically selecting an enabled provisioned connection profile to disable.

Figure 1:
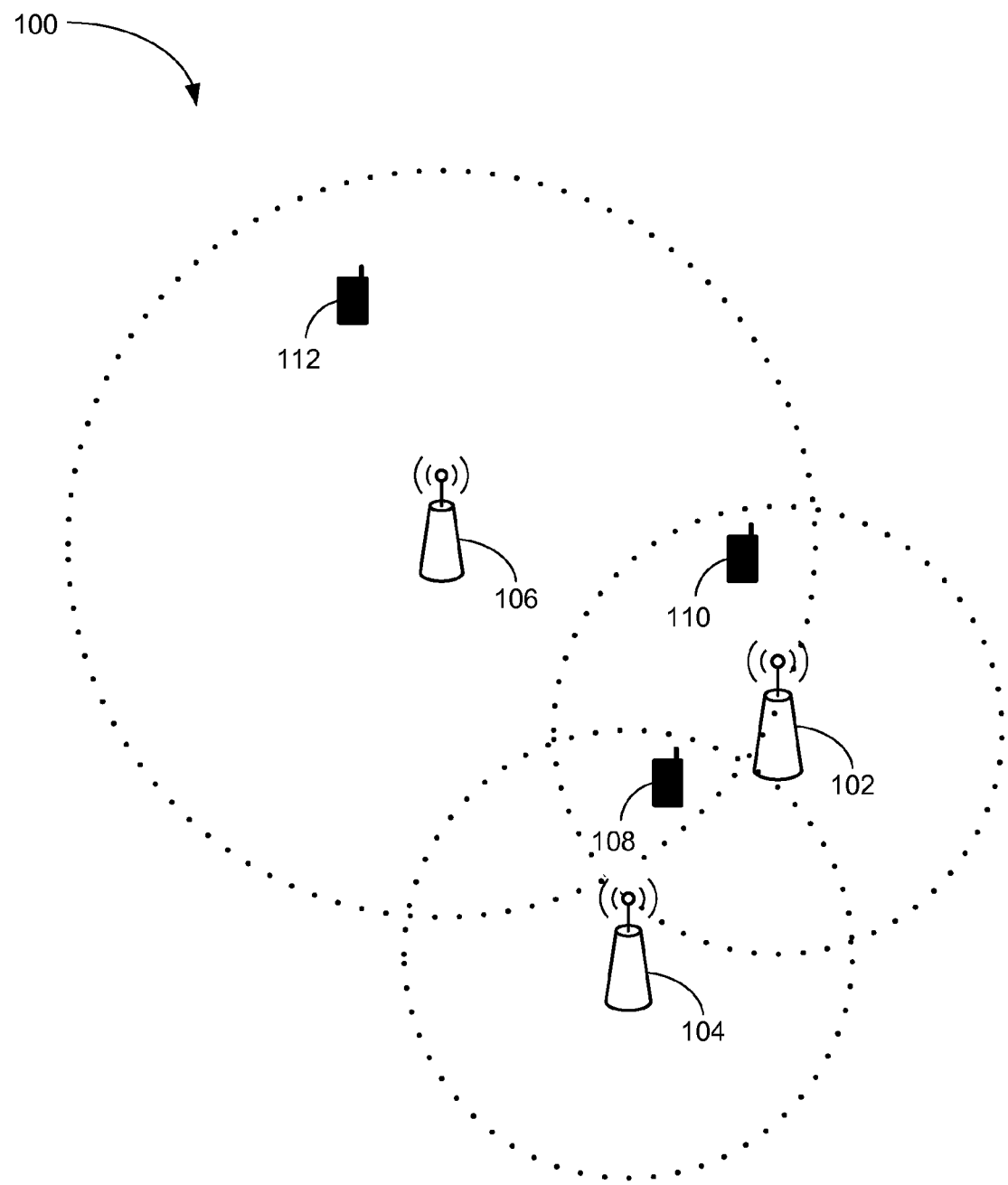
FIG. 1 is an illustration of an example wireless communication system.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

To reduce automatically a number of enabled connection profiles in a mobile station, for example, while the number of enabled connection profiles is at its maximum, a mobile station automatically selects one of the existing enabled connection profiles to disable and automatically disables the auto-selected connection profile. Enabled provisioned connection profiles are considered as candidates for disablement only if there are no enabled user-created connection profiles, and enabled third-party connection profiles are considered as candidates for disablement only if there are no enabled provisioned connection profiles and no enabled user-created connection profiles. Other factors, for example, timing of use, security type and relative priority, may be considered by the mobile station in order to automatically select which of the existing enabled connection profiles to disable.

The mobile station may automatically select one of the existing enabled connection profiles and automatically disable the auto-selected connection profile in response to a request to create a new connection profile. In other words, at the time the request is made, none of the connection profiles stored in the mobile station includes the network name that is to be included in the new connection profile, and the number of enabled connection profiles in the mobile station is at its maximum. Once the auto-selected connection profile has been automatically disabled by the mobile station, thus reducing the number of enabled connection profiles in the mobile station by one, the mobile station may proceed to create the new connection profile as an enabled connection profile.

There are various scenarios in which a request to create a new connection profile may be generated in the mobile station. For example, the request may be generated in response to the user providing input via user-interface components of the mobile station as part of a connection profile creation process and indicating that the input should be saved in a new connection profile. In another example, the request may be generated in response to the user providing input via user-interface components of the mobile station, the input indicative of selection of a result from a list of available networks as a target for connection, where the result includes a network name that is not included in any of the connection profiles stored in the mobile station.

The mobile station may automatically select one of the existing enabled connection profiles and automatically disable the selected connection profile in response to a request to enable a particular disabled connection profile. In other words, at the time the request is made, the number of enabled connection profiles in the mobile station is at its maximum and the request is to enable a particular one of the disabled connection profiles. Once the auto-selected connection profile has been automatically disabled by the mobile station, thus reducing the number of enabled connection profiles in the mobile station by one, the mobile station may proceed to enable the particular disabled connection profile.

There are various scenarios in which a request to enable a particular disabled connection profile may be generated in the mobile station. For example, the request may be generated in response to the user providing input via user-interface components of the mobile station indicative of instructions to enable the particular disabled connection profile. In save-then-connect scenarios, the request may be generated in response to the user providing input via user-interface components of the mobile station, for example, the input indicative of instructions to connect to the wireless network described in the particular disabled connection profile or, in another example, the input indicative of selection of a result from a list of available networks as a target for connection, the result including the network name that is included in the particular disabled connection profile. In these save-then-connect scenarios, the particular disabled connection profile will be enabled even if the mobile station is unable to connect to the wireless network described in the particular disabled connection profile. In connect-then-save scenarios, the request may be generated in response to a successful attempt to connect to the wireless network described in the particular disabled connection profile, the attempt having been made in response to the user providing input via user-interface components of the mobile station, for example, the input indicative of instructions to connect to the wireless network described in the particular disabled connection profile or, in another example, the input indicative of selection of a result from a list of available networks as a target for connection, the result including the network name that is included in the particular disabled connection profile. In these connect-then-save scenarios, the particular disabled connection profile will be enabled only if the mobile station is able to connect to the wireless network described in the particular disabled connection profile.

FIG. 1 is an illustration of an example wireless communication system, generally referenced 100. Coverage areas of access points (APs) are illustrated in FIG. 1 by dashed single. Each of AP 102, AP 104 and AP 106 supports a wireless network and is connected, directly or indirectly, to an external network (not shown), for example, the Internet. A mobile station 108 within communication range of AP 102, AP 104 and AP 106 may identify these access points during a scan for available wireless networks. If a connection profile stored by mobile station 108 describes the wireless network supported by an access point identified during a scan for available wireless networks, the access point is a candidate for an automatic connection attempt by mobile station 108. Other mobile stations, for example, a mobile station 110 and a mobile station 112, may also be within communication range of one or more of the access points.

Figure 2:
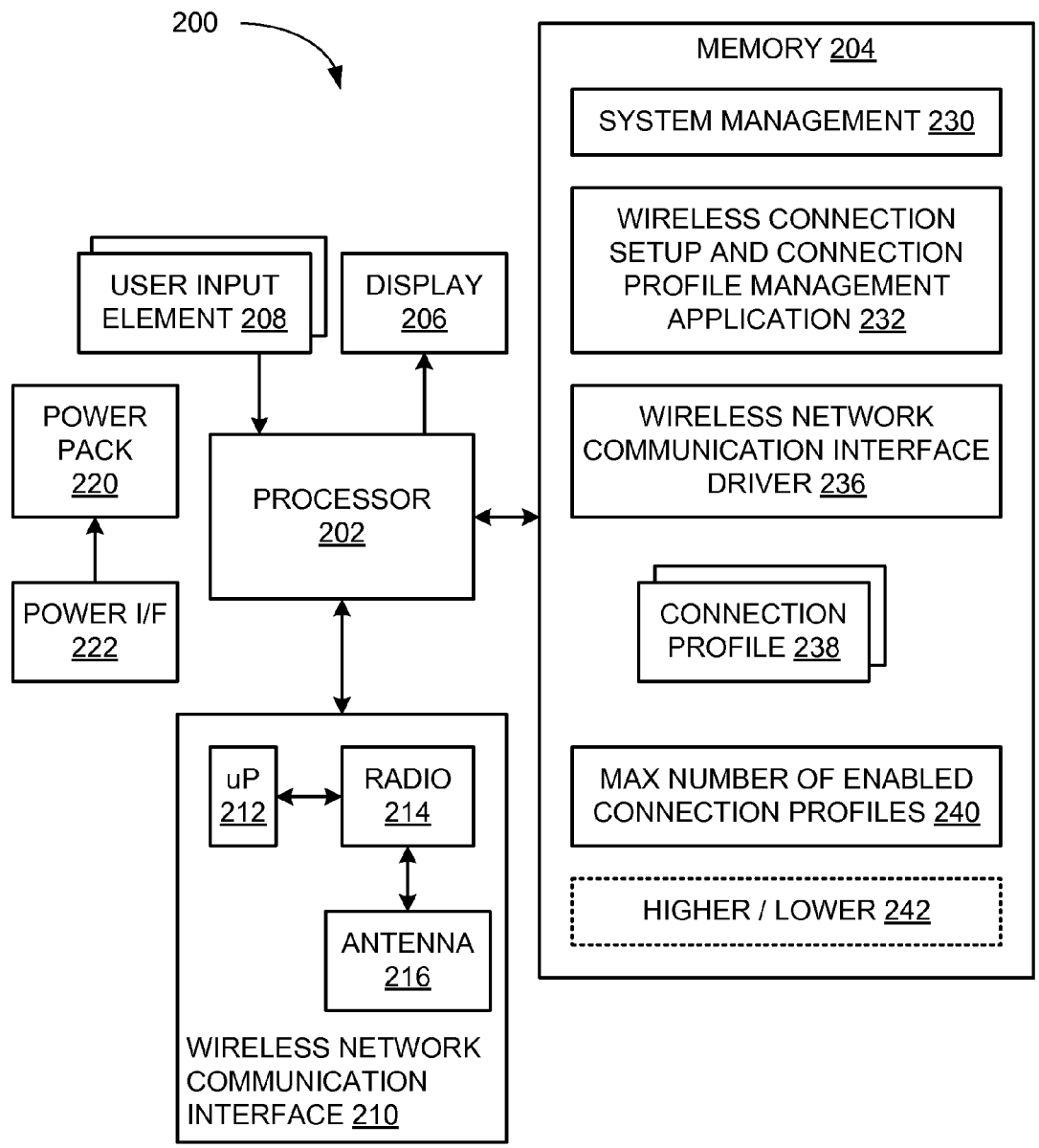
FIG. 2 is a functional block diagram illustration of an example mobile station.

FIG. 2 is a functional block diagram illustration of an example mobile station, which can be considered an example of any one of mobile stations 108, 110 and 112. The example mobile station, generally referenced 200, comprises a processor 202, a memory 204, a display 206, one or more user input elements 208, and a wireless network communication interface 210. A non-exhaustive list of examples for user input elements 208 includes a keypad, a keyboard, a button, an optical pad, a trackball, and a thumbwheel. Some mobile stations use a touchscreen, which functions both as display 206 and as one of the user input elements 208. Wireless network communication interface 210 comprises a baseband processor 212 coupled to a radio 214, which in turn is coupled to an antenna 216.

A power pack 220 supplies power to the components of mobile station 200. Power pack 220 may be removable from mobile station 200. Mobile station 200 also comprises a power interface 222, for example, a universal serial bus (USB) interface connection or an AC/DC adapter, which enables power pack 220 to be recharged from an external power source.

Mobile station 200 may comprise additional components, circuitry and functionality which, for clarity, have not been illustrated in FIG. 2.

Memory 204 is coupled to processor 202 and comprises volatile memory and non-volatile memory. Portions of memory 204 may be internal to processor 202. Memory 204 stores applications executable by processor 202, including, for example, a system management application 230, a wireless connection setup and connection profile management application 232, and a wireless network communication interface driver 236. Memory 204 also stores data files used by the applications, including, for example, one or more connection profiles 238. Memory 204 also stores an indication 240, which may be configurable or which may have a fixed value, of a maximum number of enabled connection profiles. In other words, the number of enabled connection profiles is limited in the mobile station to no more than the maximum number indicated by indication 240. For example, the maximum number may be 32 or 64. The upper limit on the number of enabled connection profiles may be due to limitations in wireless network communication interface driver 236.

Memory 204 may optionally store a configurable indication 242 whether, when selecting an existing enabled connection profile to disable and taking into account the security type, to prefer disabling connection profiles of lower security type or to prefer disabling connection profiles of higher security type. This is explained in further detail in connection with FIGS. 11-1, 11-2, 12-1 and 12-2.

Methods described in this document may be implemented by way of computer instructions to be executed by processor 202 or processor 212. For example, scanning is implemented by processor 212 under the control of wireless network communication interface driver 236. Wireless connection setup and connection profile management application 232 may be used to enable the creation and editing of connection profiles 238 and to guide a user of mobile station through the process of scanning and connecting to a wireless network, including, for example, generating a list of available wireless networks to be displayed via display 206.

Figure 3:
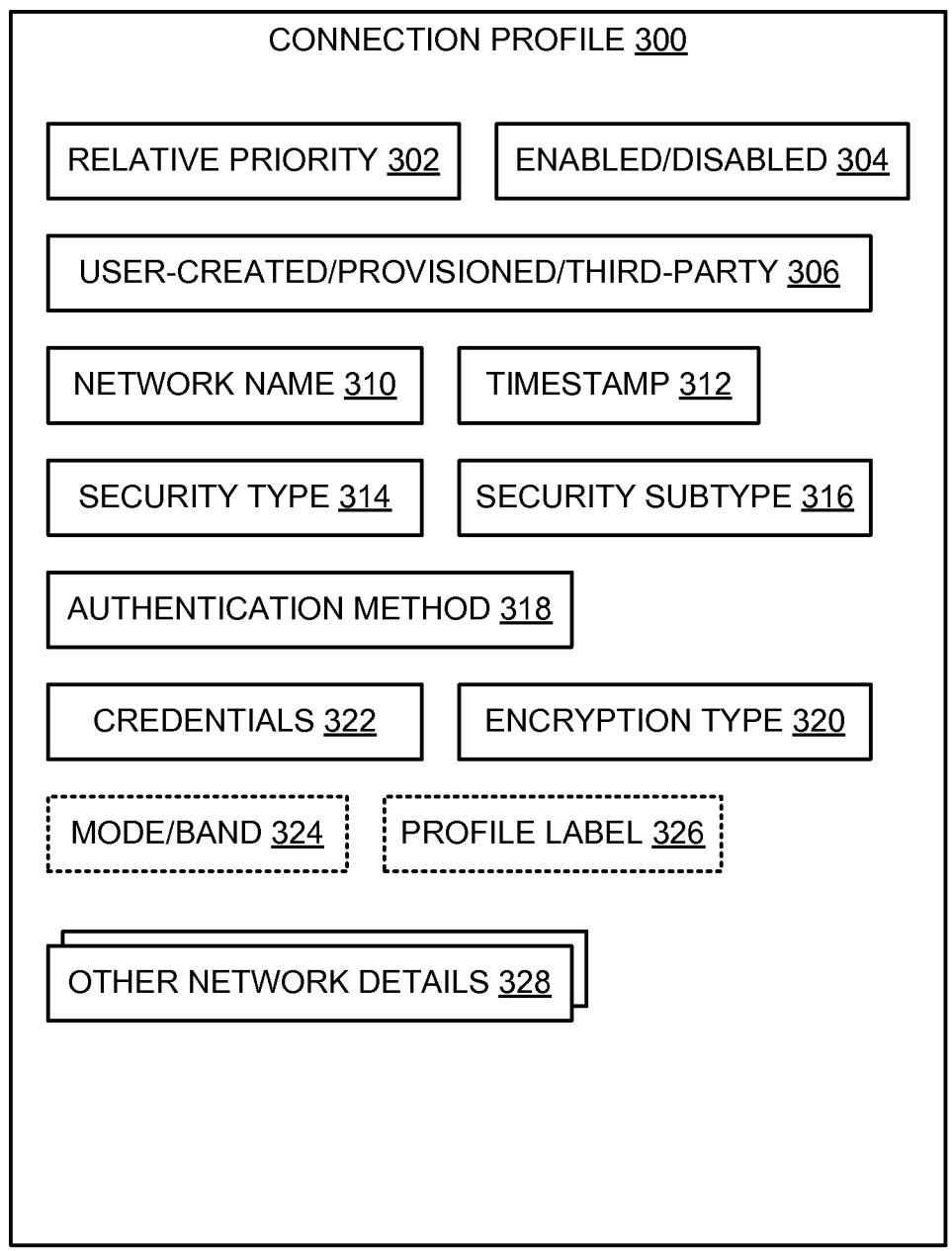
FIG. 3 is an illustration of an example connection profile.

FIG. 3 is an illustration of an example connection profile, generally referenced 300. Some of the information included in connection profile 300 may be used to determine whether to select automatically connection profile for automatic disablement, as described in further detail below with respect to FIGS. 7, 11-1, 11-2, 12-1, 12-2 and 13.

As mentioned earlier in this document, connection profiles may be assigned priority relative to each other. Connection profile 300 includes an indication 302 of its relative priority. For example, the relative priority assigned to a connection profile may be 3, meaning that there are two connection profiles stored in the mobile station of higher priority than this connection profile. Connection profile 300 further includes an indication 304 of whether the connection profile is enabled or disabled, an indication 306 of whether the connection profile is a user-created connection profile or a provisioned connection profile or a third-party connection profile. Although not illustrated as such in FIG. 3, indication 306 may be replaced by two or more indications that collectively indicate whether the connection profile is a user-created connection profile or a provisioned connection profile or a third-party connection profile.

A connection profile describes a wireless network. Connection profile 300 includes an indication 310 of the name of the wireless network, which in IEEE 802.11 is known as the SSID. The network name uniquely identifies the connection profile in the mobile station, so that no two connection profiles stored in the same mobile station include the same network name.

Connection profile 300 includes a timestamp 312 indicative of a most recent use of the connection profile. In this context, use of a connection profile may include an attempt to connect to a wireless network described in the connection profile. In other words, an automatic attempt or an attempt in response to input received via user-interface components of the mobile station, will cause the mobile station to update the value of the timestamp. Resetting the mobile station to default settings will reinitialize the timestamp to an initial value, for example, zero or a current clock value. Restoring the data in the mobile station from backup may also reinitialize the timestamp to an initial value, for example, zero or a current clock value.

Connection profile 300 includes an indication 314 of the security type implemented in the wireless network, an indication 316 of the security subtype, if applicable, an indication 318 of the authentication method implemented in the wireless network, and an indication 320 of the encryption type implemented in the wireless network. Connection profile 300 also includes an indication 322 of credentials for use with the implemented security type or with the authentication method or with both. A non-exhaustive list of examples of credentials includes a passphrase, a username, a password, an IMSI (International Mobile Subscriber Identity), a certificate, and a certificate having an expiry date.

Security types fall into one of two categories: 1) Shared Key Authentication, which uses a shared Wired Equivalent Privacy (WEP) key to authenticate a mobile station to an AP, and 2) Open Authentication. Open Authentication security types include, for example, "Open System", Wi-Fi Protected Access® (WPA)/WPA2™-Personal, which involves Temporal Key Integrity Protocol (TKIP) or Advanced Encryption Standard (AES) encryption, WPA/WPA2-Enterprise, which involves Counter-Mode/CBC-Mac Protocol (CCMP) encryption, and all flavors of the Extensible Authentication Protocol (EAP) security type. An "Open System" security type means no encryption and no authentication. The EAP security type has several flavors, for example, Lightweight EAP (LEAP), Protected EAP (PEAP), EAP Transport Layer Security (EAP-TLS), EAP Tunneled Transport Layer Security (EAP-TLS), EAP—Flexible Authentication via Secured Tunneling (EAP-FAST), EAP for GSM Subscriber Identity Modules (EAP-SIM), and EAP—Authentication and Key Agreement (EAP-AKA).

If the mobile station is capable of operating in more than one mode/frequency band, connection profile 300 may include an indication 324 of the mode in which the network operates.

Connection profile 300 may include an indication 326 of an optional label for the connection profile. Connection profile 300 may include indications 328 of other network details, for example, whether the network name is broadcasted in the wireless network or hidden, whether roaming is permitted, Internet Protocol (IP) network parameters or whether to automatically obtain an Internet Protocol (IP) address and DNS.

It will be appreciated by persons of ordinary skill in the art that there is a distinction between what information is stored in a connection profile and how that information is presented or not presented to a user of the mobile station, and that many different options for presentation are possible.

Figure 4:
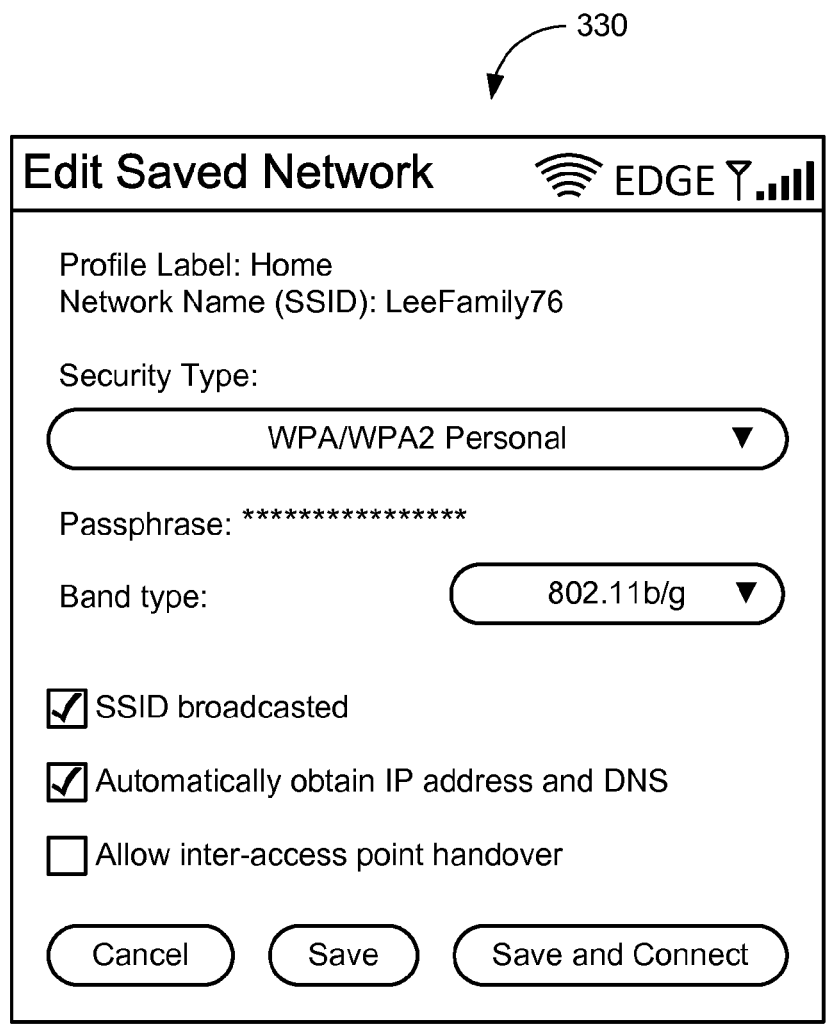
FIG. 4 is an example screenshot of the display of an example connection profile.

FIG. 4 is an example screenshot, generally referenced 330, produced by running wireless connection setup and connection profile management application 232 to display and possibly edit contents of a connection profile. In this example, the wireless network described by the connection profile has the network name "LeeFamily76", the profile label "Home", the security type "WPA/WPA2 Personal", the credentials in the form of a passphrase "x8RqK %4H?Up73bVr" (masked by asterisks in the screenshot), and the mode/band IEEE 802.11b/g. In this example, the network name is broadcasted, no IP address information is provided, and roaming is not permitted. Note that the following information is not displayed in the example screenshot: the timestamp, that the connection profile is a user-created connection profile, the relative priority of the connection profile, and that the connection profile is enabled. However, that information is still included in the connection profile as stored in the memory of the mobile station.

Figures 1, 5:
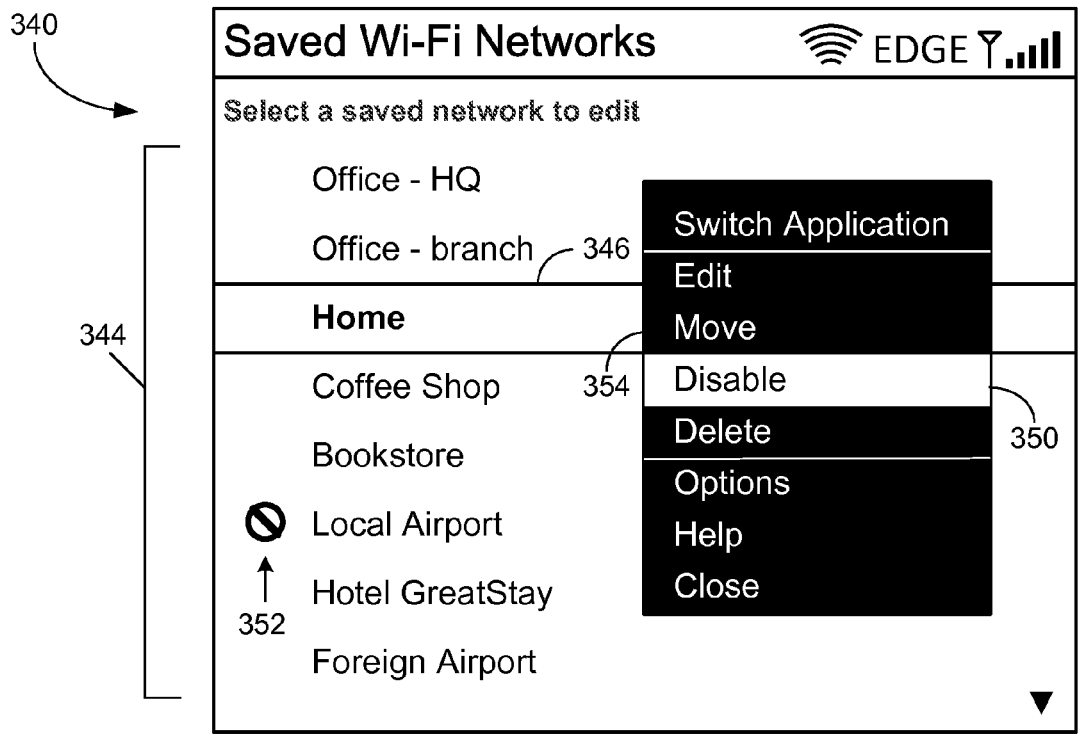
Figures 2, 5:
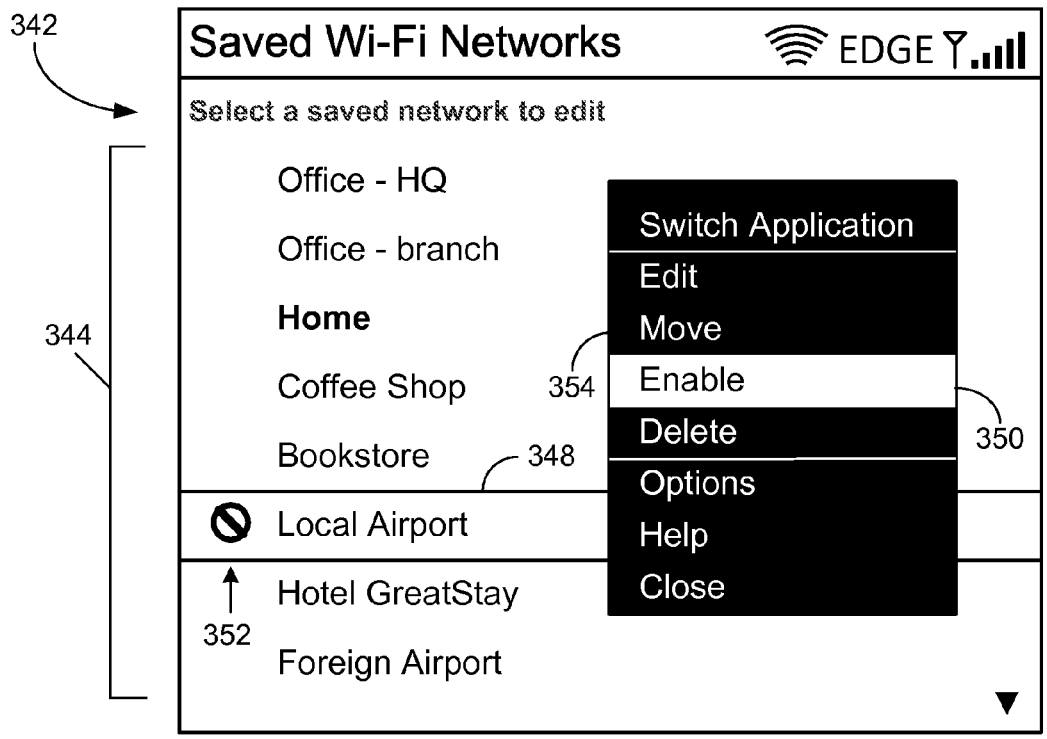

FIGS. 5-1 and 5-2 are example screenshots, generally referenced 340 and 342 respectively, produced by running wireless connection setup and connection profile management application 232 to display a prioritized list 344 of connection profiles stored in the mobile station. In these examples, toggling the enabled/disabled state of a selected connection profile (referenced 346 in FIG. 5-1 and referenced 348 in FIG. 5-2) may be accomplished through selection of an Enable/Disable menu item 350. In these examples, the enabled/disabled state of a connection profile may be presented by including a visual indicator 352 in the list of connection profiles for those of the displayed connection profiles that are disabled and omitting the visual indicator for those of the displayed connection profiles that are enabled. In these examples, the relative priority of a connection profile is indicated by its placement in the list, with the connection profile of highest priority at the top of the list and the connection profile of lowest priority at the bottom of the list. In these examples, the relative priority of the selected connection profile can be changed by selecting a Move menu item 354 and using the user-interface components of the mobile station to move the selected connection profile from its current location in the list to a different location.

Figure 6:
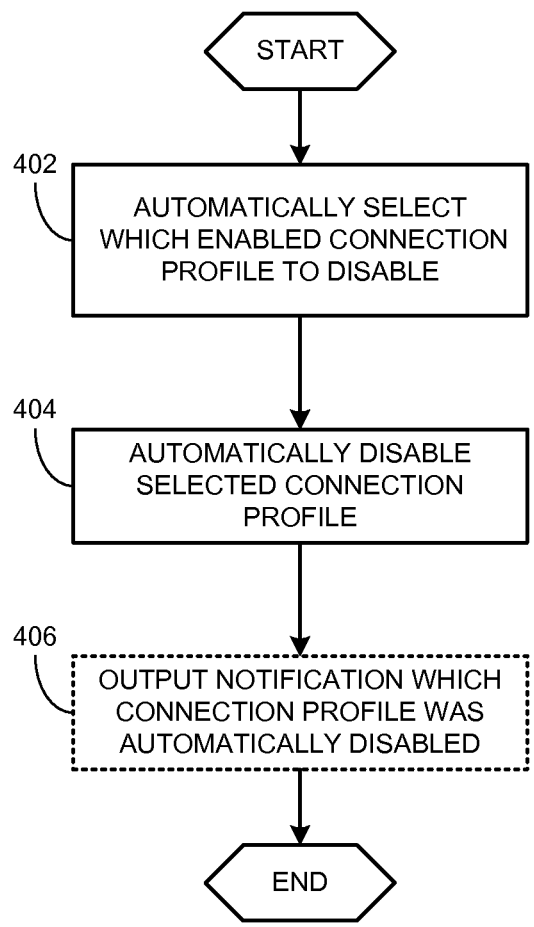
FIG. 6 is a flowchart illustration of an example method for automatically reducing a number of enabled connection profiles.

FIG. 6 is a flowchart illustration of an example method for automatically reducing a number of enabled connection profiles. The method may be performed by wireless connection setup and connection profile management application 232, when executed by processor 202 of mobile station 200. The method may be performed while the number of enabled connection profiles in the mobile station is at its maximum. Alternatively, the method may be performed while the number of enabled connection profiles in the mobile station is less than its maximum.

The mobile station automatically selects at 402 which one of the enabled connection profiles to automatically disable. The mobile station automatically disables the selected enabled connection profile at 404, thus reducing the number of enabled connection profiles stored in the mobile station by one. Optionally, the mobile station outputs via one or more of its user-interface components 406 a notification identifying which connection profile was automatically disabled at 404. An example screenshot of an example notification is described below with respect to FIG. 8.

Figure 7:
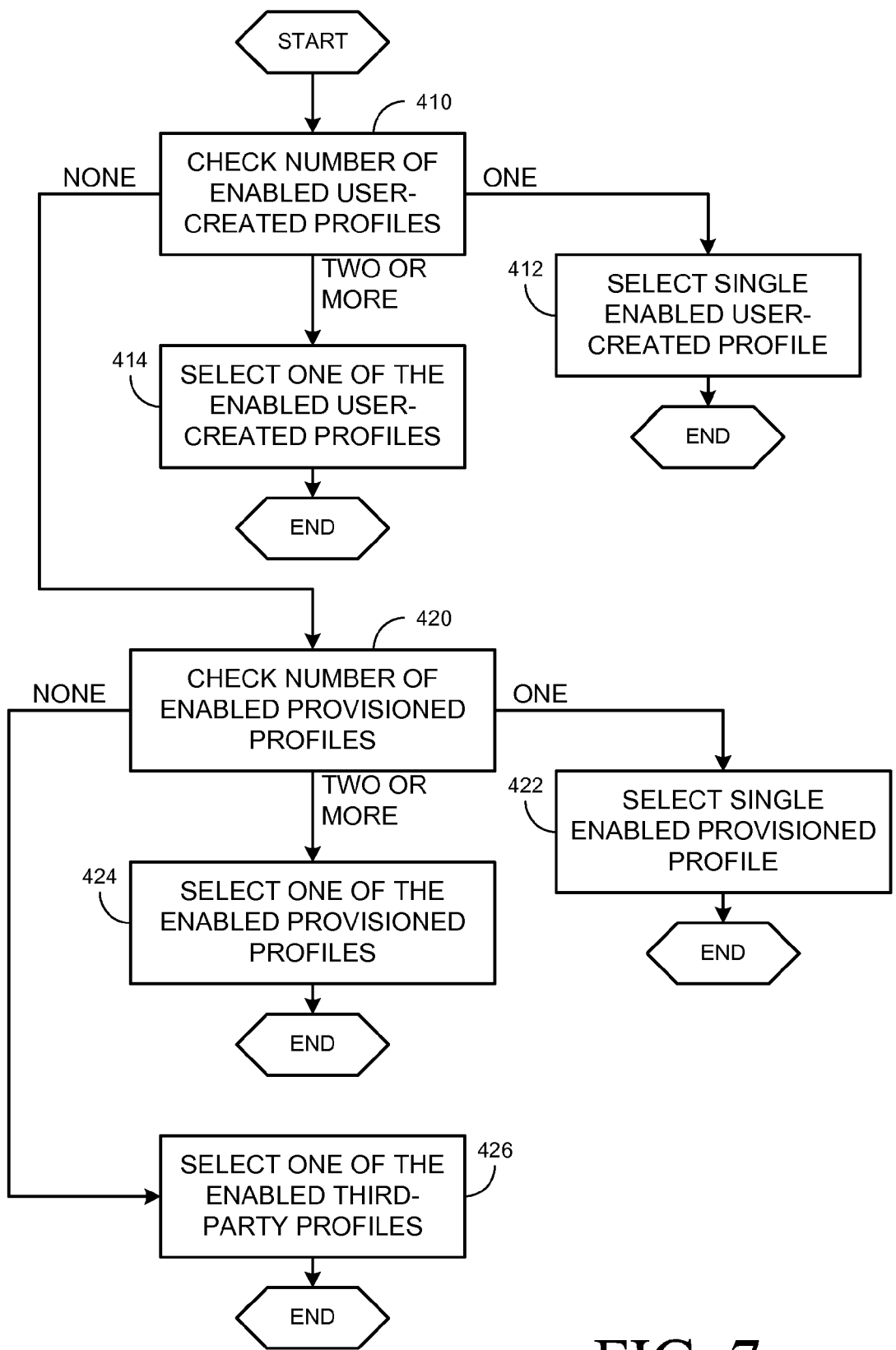
FIG. 7 is a flowchart illustration of an example method for automatically selecting which enabled connection profile to disable.

FIG. 7 is a flowchart illustration of an example method for automatically selecting which enabled connection profile to disable. The method may be performed by wireless connection setup and connection profile management application 232, when executed by processor 202 of mobile station 200. The method is an example of what happens at 402 in the method illustrated in FIG. 6, at 508 in the method illustrated in FIG. 9, or at 608 in the method illustrated in FIG. 10.

When the method begins, the candidates for disablement can be expressed as the set {enabled connection profiles}. Enabled provisioned connection profiles are considered as candidates for disablement only if there are no enabled user-created connection profiles, and enabled third-party connection profiles are considered as candidates for disablement only if there are no enabled provisioned connection profiles and no enabled user-created connection profiles. The method automatically disables an enabled third-party connection profile only as a last resort, because disabling a third-party connection profile may adversely affect the functionality or operation of the third-party application that is installed in the mobile station. Determining whether an enabled connection profile is a user-created connection profile or a provisioned connection profile or a third-party connection profile may be accomplished, for example, by checking indication 306 of the connection profile.

At 410, the mobile station checks how many of the enabled connection profiles currently stored in the mobile station are user-created connection profiles. If there is only one enabled user-created connection profile, then the mobile station selects at 412 the single enabled user-created connection profile for automatic disablement, and the method ends. If there are two or more enabled user-created connection profiles, then the candidates for disablement can be expressed as the set {enabled user-created connection profiles} and the mobile station selects at 414 one of the enabled user-created connection profiles. Example methods for selection of an enabled user-created connection profile are described below with respect to FIGS. 11-1 and 11-2.

If, as checked at 410, there are no enabled user-created connection profiles, the mobile station checks at 420 how many of the enabled connection profiles currently stored in the mobile station are provisioned connection profiles. If there is only one enabled provisioned connection profile, then the mobile station selects at 422 the single enabled provisioned connection profile for automatic disablement, and the method ends. If there are two or more enabled provisioned connection profiles, then the candidates for disablement can be expressed as the set {enabled provisioned connection profiles} and the mobile station selects at 424 one of the enabled provisioned connection profiles. Example methods for selection of an enabled provisioned connection profile are described below with respect to FIGS. 12-1 and 12-2.

If, as checked at 420, there are no enabled provisioned connection profiles, then the candidates for disablement can be expressed as the set {enabled third-party connection profiles} and the mobile station selects at 426 one of the enabled third-party connection profiles. An example method for selection of an enabled third-party connection profile is described below with respect to FIG. 13.

Figure 8:
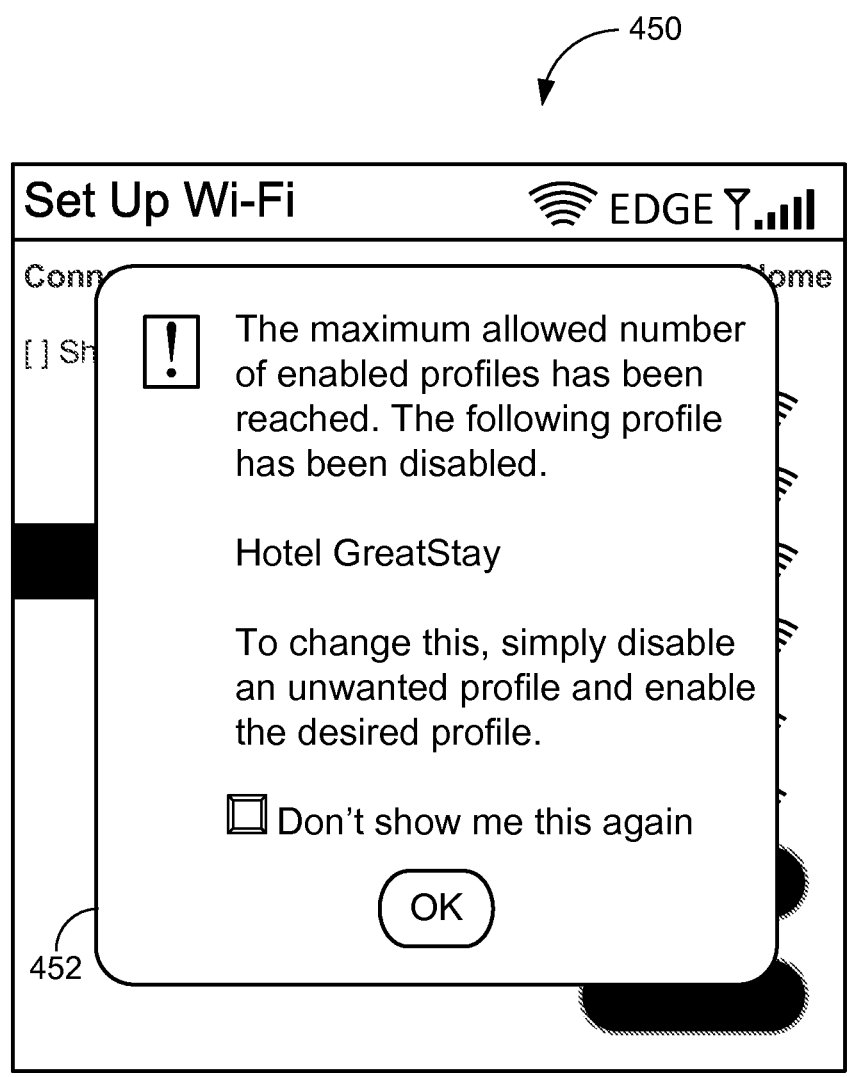
FIG. 8 is an example screenshot of an example notification displayed on the mobile station following the automatic disabling of an existing enabled connection profile.

FIG. 8 is an illustration of an example screenshot, generally referenced 450, of an example notification 452 displayed on a display of the mobile station following the automatic disabling of an existing enabled connection profile.

Figure 9:
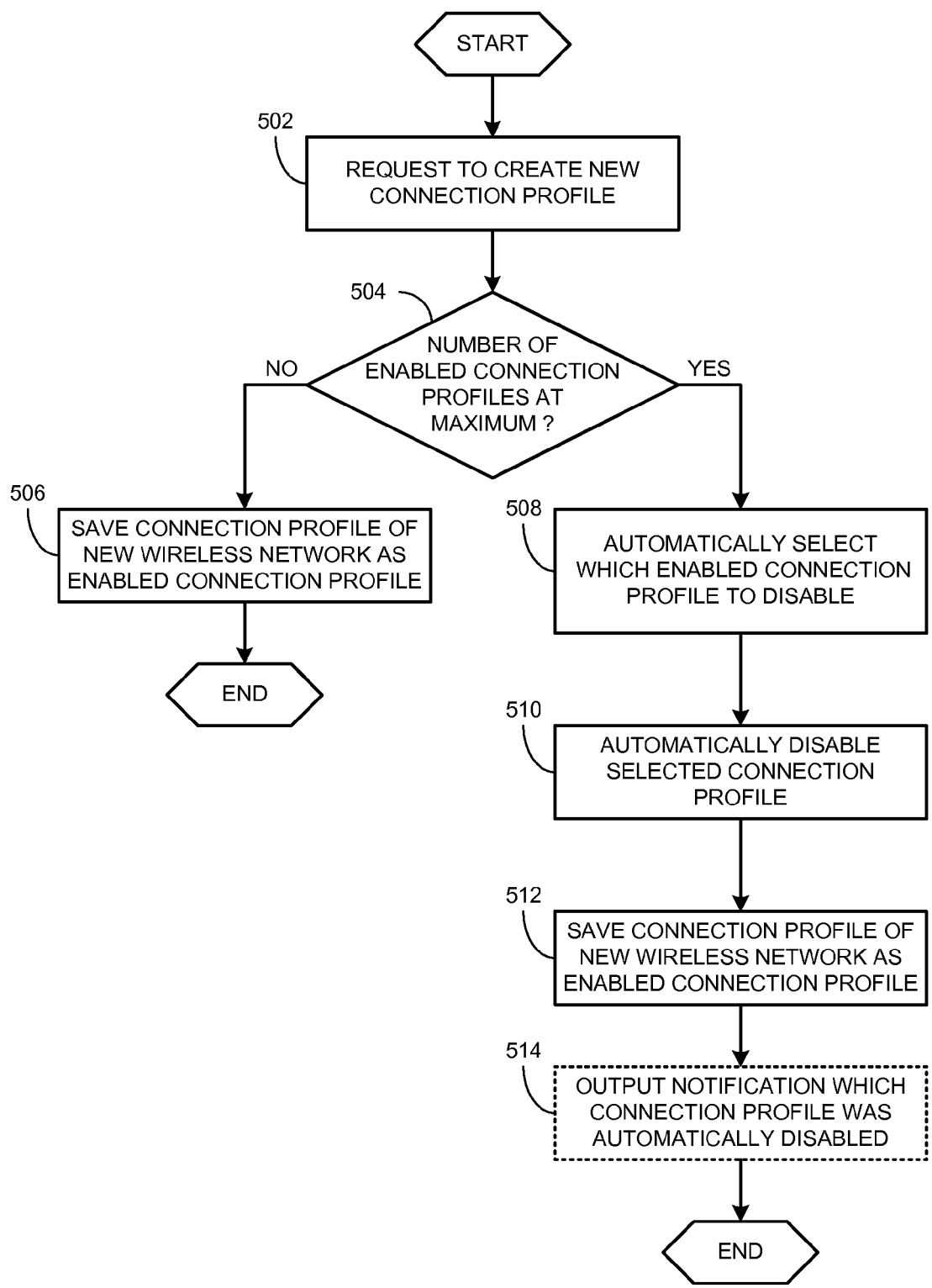
FIG. 9 is a flowchart illustration of an example method for handling a request to create a new connection profile.

FIG. 9 is a flowchart illustration of an example method for handling a request to create a new connection profile. In other words, at the time the request is made, none of the connection profiles stored in the mobile station includes the network name that is to be included in the new connection profile. The method may be performed by wireless connection setup and connection profile management application 232, when executed by processor 202 of mobile station 200.

There are various scenarios in which the request to create a new connection profile may be generated by wireless connection setup and connection profile management application 232. For example, the request may be generated in response to receiving input via user-interface components of the mobile station as part of a connection profile creation process and indicating that the input should be saved in a new connection profile. In another example, the request may be generated in response to receiving input via user-interface components of the mobile station, the input indicative of selection of a result from a list of available networks as a target for connection, where the result includes a network name that is not included in any of the connection profiles stored in the mobile station.

At 502, a request to create a new connection profile is generated in the mobile station.

At 504, the mobile station checks whether the number of enabled connection profiles—not including the new requested connection profile—is at its maximum. If the current number of enabled connection profiles stored in the mobile station is less than the maximum number indicated by indication 240, then the mobile station saves at 506 the input received via the user-interface components as part of a connection profile creation process in a new enabled connection profile, thus increasing the total number of enabled connection profiles stored in the mobile station by 1.

If the current number of enabled connection profiles stored in the mobile station is equal to the maximum number indicated by indication 240, then the mobile station does not immediately save the input received via the user-interface components as part of a connection profile creation process in a new enabled connection profile, because to do so would violate the limit on the number of enabled connection profiles. Rather, the mobile station performs the following actions:

a) the mobile station automatically selects at 508 which one of the enabled connection profiles to automatically disable;

b) the mobile station automatically disables the selected enabled connection profile at 510, thus decreasing the total number of enabled connection profiles stored in the mobile station by 1;

c) the mobile station saves at 512 the input received via the user-interface components as part of a connection profile creation process in a new enabled connection profile, thus increasing the total number of enabled connection profiles stored in the mobile station by 1; and d) optionally, the mobile station outputs via one or more of its user-interface components at 514 a notification identifying which connection profile was automatically disabled at 510.

Figure 10:
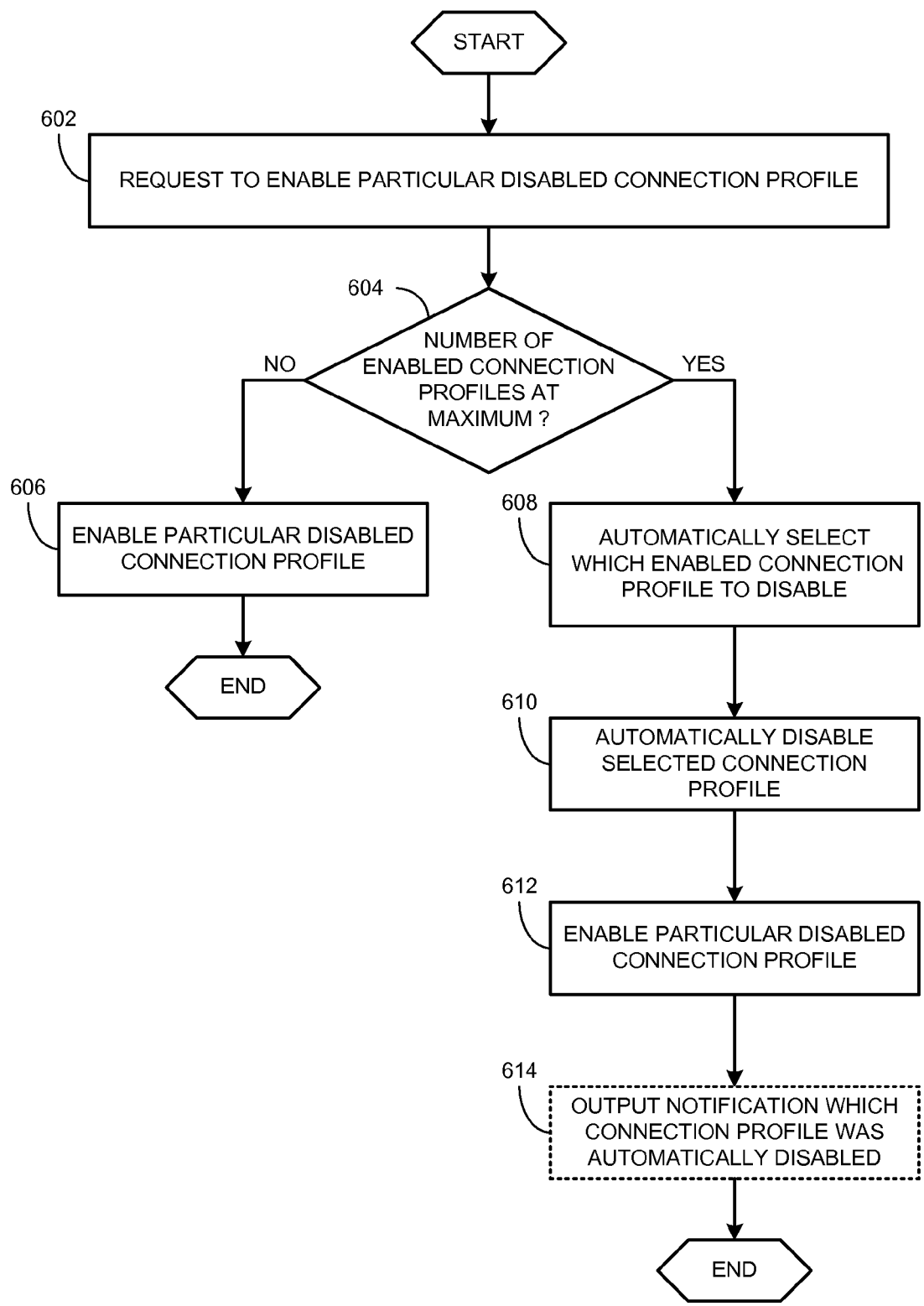
FIG. 10 is a flowchart illustration of an example method for handling a request to enable a particular disabled connection profile.

FIG. 10 is a flowchart illustration of an example method for handling a request to enable a particular disabled connection profile. The method may be performed by wireless connection setup and connection profile management application 232, when executed by processor 202 of mobile station 200.

There are various scenarios in which a request to enable a particular disabled connection profile may be generated by wireless connection setup and connection profile management application 232. For example, the request may be generated in response to receiving input via user-interface components of the mobile station, the input indicative of instructions to enable the particular disabled connection profile. In save-then-connect scenarios, the request may be generated in response to receiving input via user-interface components of the mobile station, for example, the input indicative of instructions to connect to the wireless network described in the particular disabled connection profile or, in another example, the input indicative of selection of a result from a list of available networks as a target for connection, the result including the network name that is included in the particular disabled connection profile. In these save-then-connect scenarios, the particular disabled connection profile will be enabled even if the mobile station is unable to connect to the wireless network described in the particular disabled connection profile. In connect-then-save scenarios, the request may be generated in response to a successful attempt to connect to a the wireless network described in the particular disabled connection profile, the attempt having been made in response to receiving input via user-interface components of the mobile station, for example, the input indicative of instructions to connect to the wireless network described in the particular disabled connection profile or, in another example, the input indicative of selection of a result from a list of available networks as target for connection, the result including the network name that is included in the particular disabled connection profile. In these connect-then-save scenarios, the particular disabled connection profile will be enabled only if the mobile station is able to connect to the wireless network described in the particular disabled connection profile.

At 602, a request to enable a particular disabled connection profile is generated in the mobile station.

At 604, the mobile station checks whether the number of enabled connection profiles is at its maximum. If the current number of enabled connection profiles stored in the mobile station is less than the maximum number indicated by indication 240, then the mobile station enables at 606 the particular disabled connection profile, thus increasing the total number of enabled connection profiles stored in the mobile station by 1.

If the current number of enabled connection profiles stored in the mobile station is equal to the maximum number indicated by indication 240, then the mobile station does not immediately enable the particular disabled connection profile, because to do so would violate the limit on the number of enabled connection profiles. Rather, the mobile station performs the following actions:

a) the mobile station automatically selects at 608 which one of the enabled connection profiles to automatically disable;

b) the mobile station automatically disables the selected enabled connection profile at 610, thus decreasing the total number of enabled connection profiles stored in the mobile station by 1;

c) the mobile station enables at 612 the particular disabled connection profile, thus increasing the total number of enabled connection profiles stored in the mobile station by 1; and d) optionally, the mobile station outputs via one or more of its user-interface components at 614 a notification identifying which connection profile was automatically disabled at 610.

Figures 1, 11:
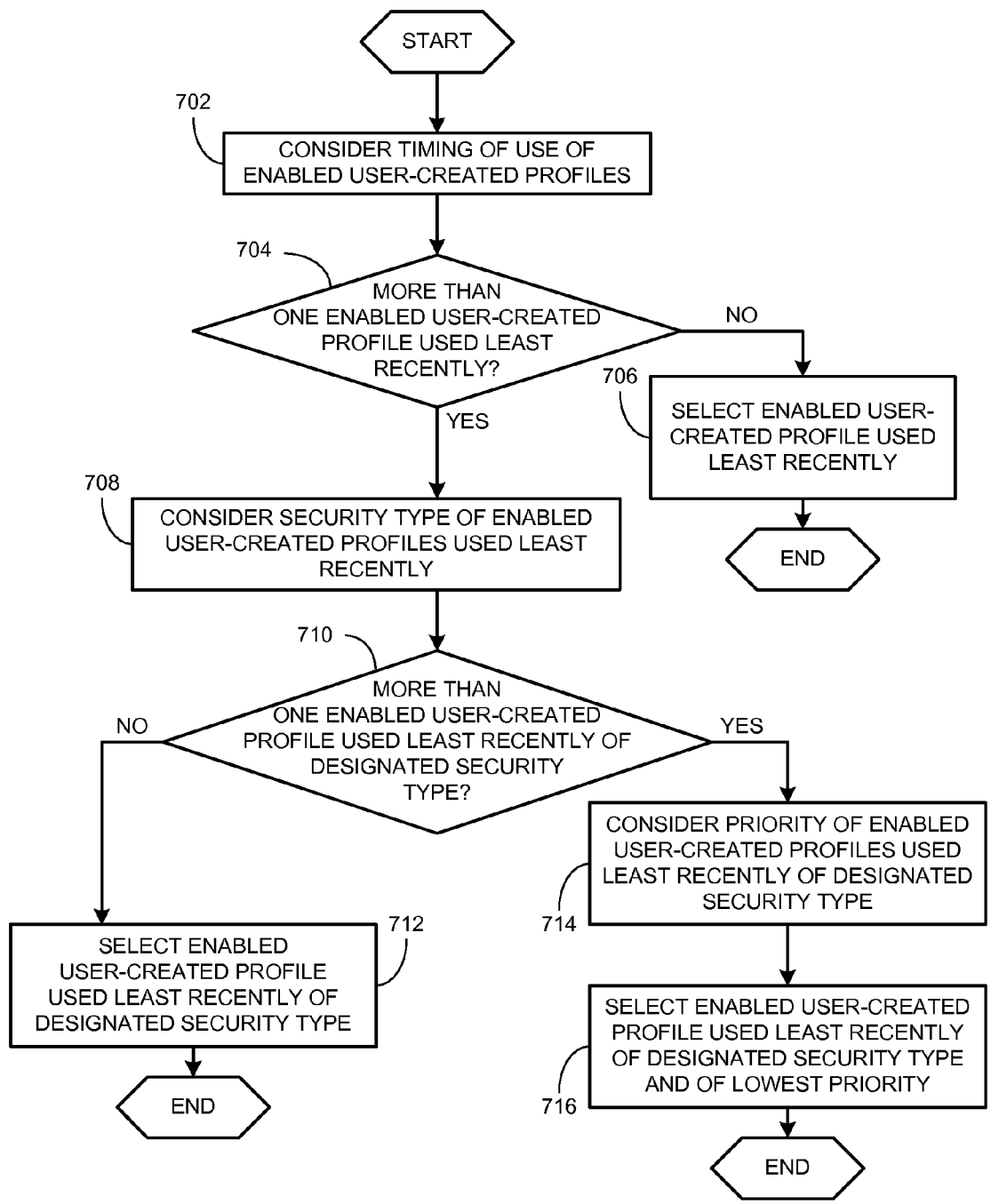
Figures 2, 11:
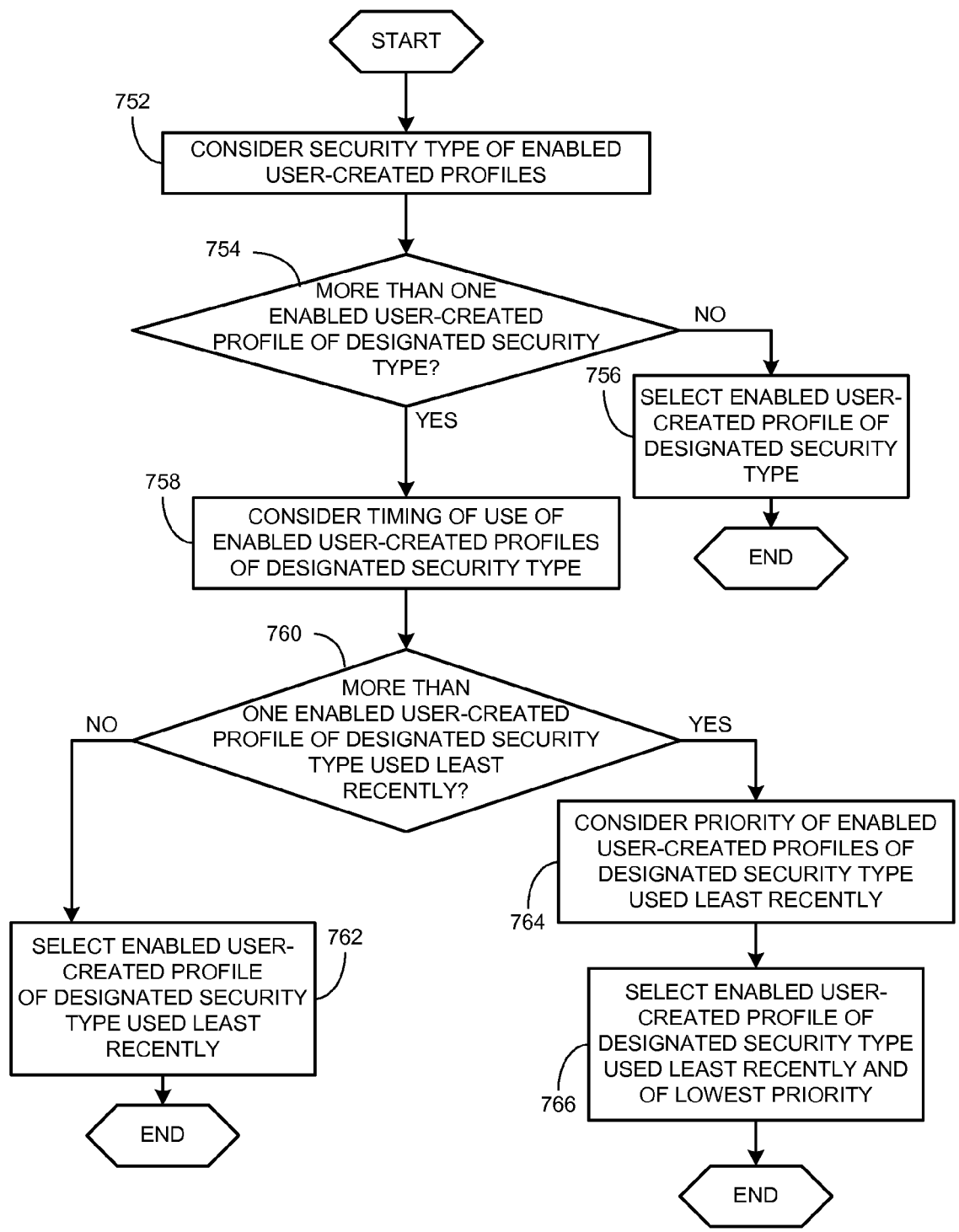

FIGS. 11-1 and 11-2 are flowchart illustrations of alternate example methods for automatically selecting an enabled user-created connection profile to automatically disable. The method may be performed by wireless connection setup and connection profile management application 232, when executed by processor 202 of mobile station 200. The method is an example of what happens at 414 in the method illustrated in FIG. 7. As described in more detail below, the method illustrated in FIG. 11-1 involves considering timing of use and then security type when automatically selecting an enabled user-created connection profile for automatic disablement, and the method illustrated in FIG. 11-2 involves considering security type and then timing of use when automatically selecting an enabled user-created connection profile for automatic disablement.

When the method begins, the candidates for disablement can be expressed as the set {enabled user-created connection profiles}, and the set has at least two candidates.

Starting with FIG. 11-1, the mobile station considers at 702 timing of use of the enabled user-created connection profiles. For example, the mobile station may identify, by comparing timestamps, which of the enabled user-created connection profiles was used least recently. It is contemplated that, due to re-initialization of the timestamps when the mobile station is restored from backup or is reset to default settings, that two or more connection profiles may have identical timestamps. At this point, the remaining candidates for disablement can be expressed as the following intersection: {enabled user-created connection profiles}∩{least recently used connection profiles}.

If, as checked at 704, there is only one enabled user-created connection profile used least recently, then the mobile station selects at 706 the enabled user-created connection profile used least recently as the enabled connection profile to be automatically disabled, and the method ends.

If, as checked at 704, there are two or more enabled user-created connection profiles used least recently, then the mobile station considers at 708 the security types of the enabled user-created connection profiles used least recently.

The mobile station may optionally be configurable to prefer disabling connection profiles of higher security type or to prefer disabling connection profiles of lower security type, and indication 242 of the preference may be stored in memory 204. Alternatively, wireless connection setup and connection profile management application 232 may be designed to prefer disabling connection profiles of lower security type. Alternatively, wireless connection setup and connection profile management application 232 may be designed to prefer disabling connection profiles of higher security type. In the description that follows, the phrase "designated security type" means the highest security type from among the remaining candidates if that is the configuration or design of the mobile station, and means the lowest security type from among the remaining candidates if that is the configuration or design of the mobile station.

At this point, the remaining candidates for disablement can be expressed as the following intersection: {enabled user-created connection profiles}∩{least recently used connection profiles}∩{designated security type}.

If, as checked at 710, there is only one enabled user-created connection profile used least recently of the designated security type, then the mobile station selects at 712 the enabled user-created connection profile used least recently of the designated security type as the enabled connection profile to be automatically disabled, and the method ends.

If, as checked at 710, there are two or more enabled user-created connection profiles used least recently of the designated security type, then the mobile station considers at 714 the priority of the remaining candidates. As mentioned above, all connection profiles are assigned a relative priority. Thus the mobile station selects at 716 as the enabled connection profile to be automatically disabled the enabled user-created connection profile used least recently of the designated security type that is of the lowest priority, and the method ends.

Turning now to FIG. 11-2, the mobile station considers at 752 the security types of the enabled user-created connection profiles.

As mentioned above, the mobile station may optionally be configurable to prefer disabling connection profiles of higher security type or to prefer disabling connection profiles of lower security type, and indication 242 of the preference may be stored in memory 204. Alternatively, wireless connection setup and connection profile management application 232 may be designed to prefer disabling connection profiles of lower security type. Alternatively, wireless connection setup and connection profile management application 232 may be designed to prefer disabling connection profiles of higher security type. In the description that follows, the phrase "designated security type" means the highest security type from among the remaining candidates if that is the configuration or design of the mobile station, and means the lowest security type from among the remaining candidates if that is the configuration or design of the mobile station.

At this point, the remaining candidates for disablement can be expressed as the following intersection: {enabled user-created connection profiles}∩{designated security type}.

If, as checked at 754, there is only one enabled user-created connection profile of the designated security type, then the mobile station selects at 756 the enabled user-created connection profile of the designated security type as the enabled connection profile to be automatically disabled, and the method ends.

If, as checked at 754, there are two or more enabled user-created connection profiles of the designated security type, then the mobile station considers at 758 the timing of use of the enabled user-created connection profiles of the designated security type. For example, the mobile station may identify, by comparing timestamps, which of the enabled user-created connection profiles of the designated security type was used least recently. It is contemplated that, due to re-initialization of the timestamps when the mobile station is restored from backup or is reset to default settings, that two or more connection profiles may have identical timestamps. At this point, the remaining candidates for disablement can be expressed as the following intersection: {enabled user-created connection profiles}∩{designated security type}∩{least recently used connection profiles}.

If, as checked at 760, there is only one enabled user-created connection profile of the designated security type used least recently, then the mobile station selects at 762 the enabled user-created connection profile of the designated security type used least recently as the enabled connection profile to be automatically disabled, and the method ends.

If, as checked at 760, there are two or more enabled user-created connection profiles of the designated security type used least recently, then the mobile station considers at 764 the priority of the remaining candidates. As mentioned above, all connection profiles are assigned a relative priority. Thus the mobile station selects at 766 as the enabled connection profile to be automatically disabled the enabled user-created connection profile of the designated security used least recently that is of the lowest priority, and the method ends.

Figures 1, 12:
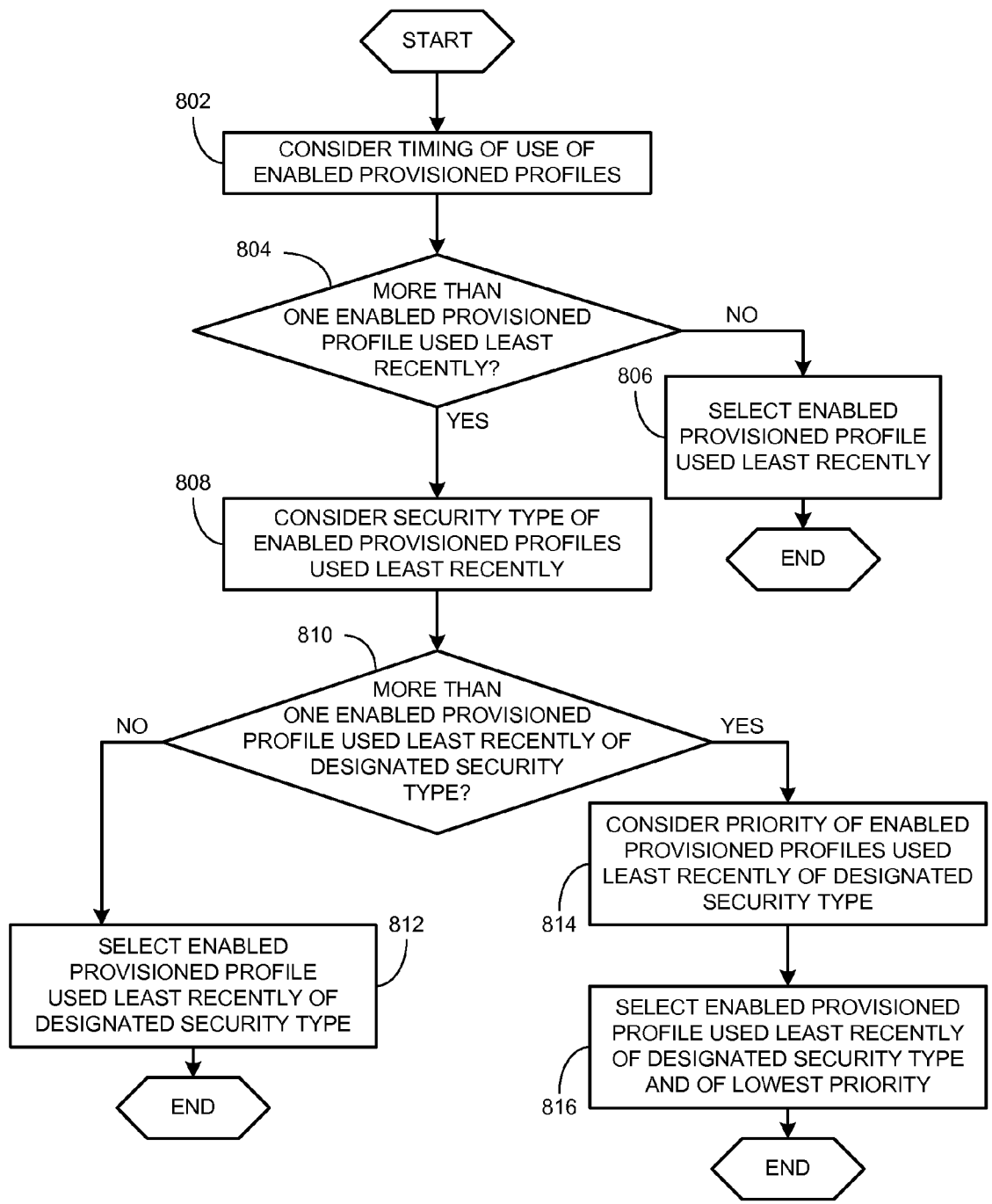
Figures 2, 12:
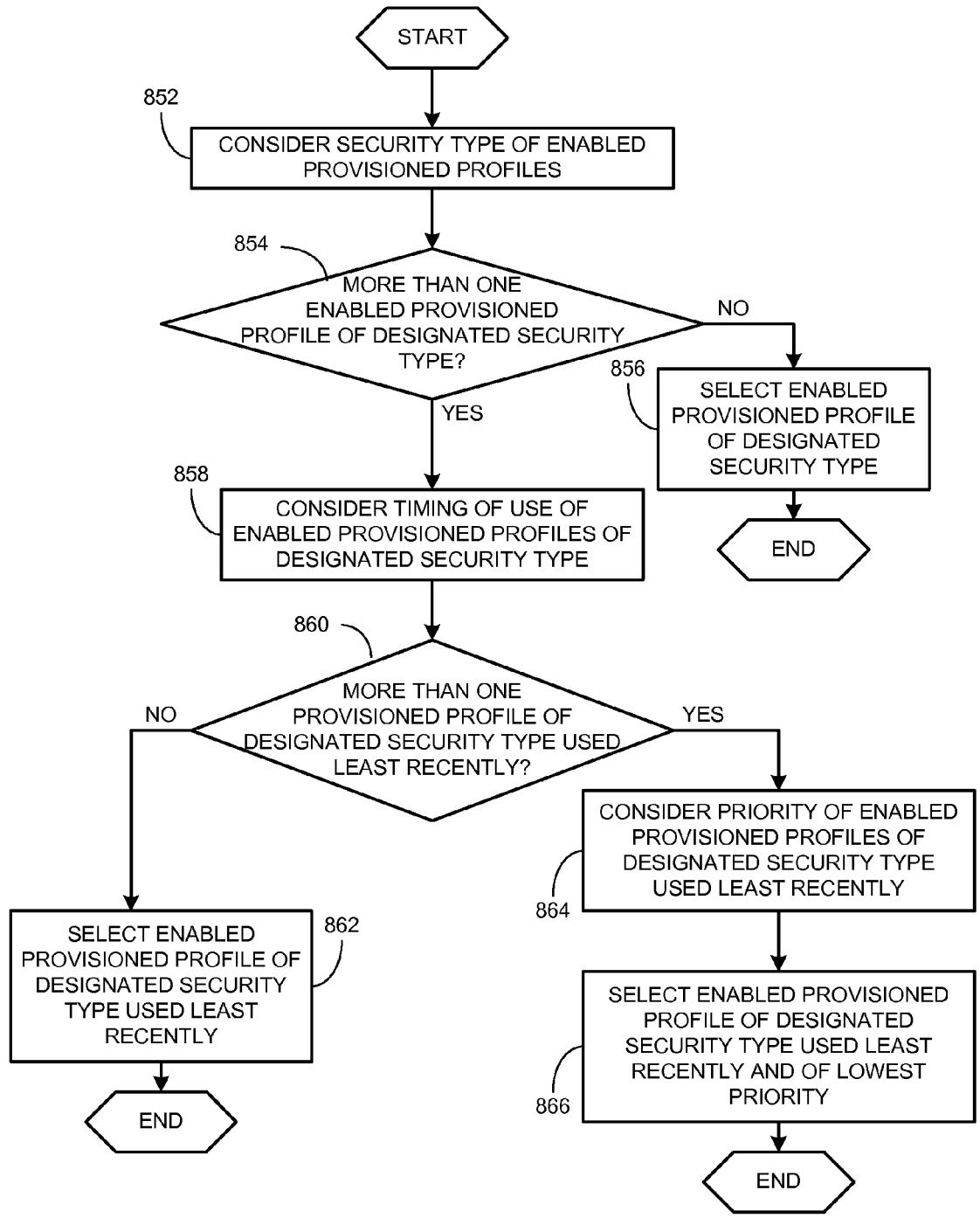

FIGS. 12-1 and 12-2 are flowchart illustrations of alternate example methods for automatically selecting an enabled provisioned connection profile to automatically disable. The method may be performed by wireless connection setup and connection profile management application 232, when executed by processor 202 of mobile station 200. The method is an example of what happens at 424 in the method illustrated in FIG. 7. As described in more detail below, the method illustrated in FIG. 12-1 involves considering timing of use and then security type when automatically selecting an enabled user-created connection profile for automatic disablement, and the method illustrated in FIG. 12-2 involves considering security type and then timing of use when automatically selecting an enabled user-created connection profile for automatic disablement.

When the method begins, the candidates for disablement can be expressed as the set {enabled provisioned connection profiles}, and the set has at least two candidates.

Starting with FIG. 12-1, the mobile station considers at 802 timing of use of the enabled provisioned connection profiles. For example, the mobile station may identify, by comparing timestamps, which of the enabled provisioned connection profiles was used least recently. It is contemplated that, due to re-initialization of the timestamps when the mobile station is restored from backup or is reset to default settings, that two or more connection profiles may have identical timestamps. At this point, the remaining candidates for disablement can be expressed as the following intersection: {enabled provisioned connection profiles}∩{least recently used connection profiles}.

If, as checked at 804, there is only one enabled provisioned connection profile used least recently, then the mobile station selects at 806 the enabled provisioned connection profile used least recently as the enabled connection profile to be automatically disabled, and the method ends.

If, as checked at 804, there are two or more enabled provisioned connection profiles used least recently, then the mobile station considers at 808 the security types of the enabled provisioned connection profiles used least recently.

At this point, the remaining candidates for disablement can be expressed as the following intersection: {enabled provisioned connection profiles}∩{least recently used connection profiles}∩{designated security type}.

If, as checked at 810, there is only one enabled provisioned connection profile used least recently of the designated security type, then the mobile station selects at 812 the enabled provisioned connection profile used least recently of the designated security type as the enabled connection profile to be automatically disabled, and the method ends.

If, as checked at 810, there are two or more enabled provisioned connection profiles used least recently of the designated security type, then the mobile station considers at 814 the priority of the remaining candidates. Thus the mobile station selects at 816 as the enabled connection profile to be automatically disabled the enabled provisioned connection profile used least recently of the designated security type that is of the lowest priority, and the method ends.

Turning now to FIG. 12-2, the mobile station considers at 852 the security types of the security types of the enabled provisioned connection profiles.

As mentioned above, the mobile station may optionally be configurable to prefer disabling connection profiles of higher security type or to prefer disabling connection profiles of lower security type, and indication 242 of the preference may be stored in memory 204. Alternatively, wireless connection setup and connection profile management application 232 may be designed to prefer disabling connection profiles of lower security type. Alternatively, wireless connection setup and connection profile management application 232 may be designed to prefer disabling connection profiles of higher security type. In the description that follows, the phrase "designated security type" means the highest security type from among the remaining candidates if that is the configuration or design of the mobile station, and means the lowest security type from among the remaining candidates if that is the configuration or design of the mobile station.

At this point, the remaining candidates for disablement can be expressed as the following intersection: {enabled provisioned connection profiles}∩{designated security type}.

If, as checked at 854, there is only one enabled provisioned connection profile of the designated security type, then the mobile station selects at 856 the enabled provisioned connection profile of the designated security type as the enabled connection profile to be automatically disabled, and the method ends.

If, as checked at 854, there are two or more enabled provisioned connection profiles of the designated security type, then the mobile station considers at 858 the timing of use of the enabled provisioned connection profiles of the designated security type. For example, the mobile station may identify, by comparing timestamps, which of the enabled provisioned connection profiles of the designated security type was used least recently. It is contemplated that, due to re-initialization of the timestamps when the mobile station is restored from backup or is reset to default settings, that two or more connection profiles may have identical timestamps. At this point, the remaining candidates for disablement can be expressed as the following intersection: {enabled provisioned connection profiles}∩{designated security type}∩{least recently used connection profiles}.

If, as checked at 860, there is only one enabled provisioned connection profile of the designated security type used least recently, then the mobile station selects at 862 the enabled provisioned connection profile of the designated security type used least recently as the enabled connection profile to be automatically disabled, and the method ends.

If, as checked at 860, there are two or more enabled provisioned connection profiles of the designated security type used least recently, then the mobile station considers at 864 the priority of the remaining candidates. As mentioned above, all connection profiles are assigned a relative priority. Thus the mobile station selects at 866 as the enabled connection profile to be automatically disabled the enabled provisioned connection profile of the designated security used least recently that is of the lowest priority, and the method ends.

Figure 13:
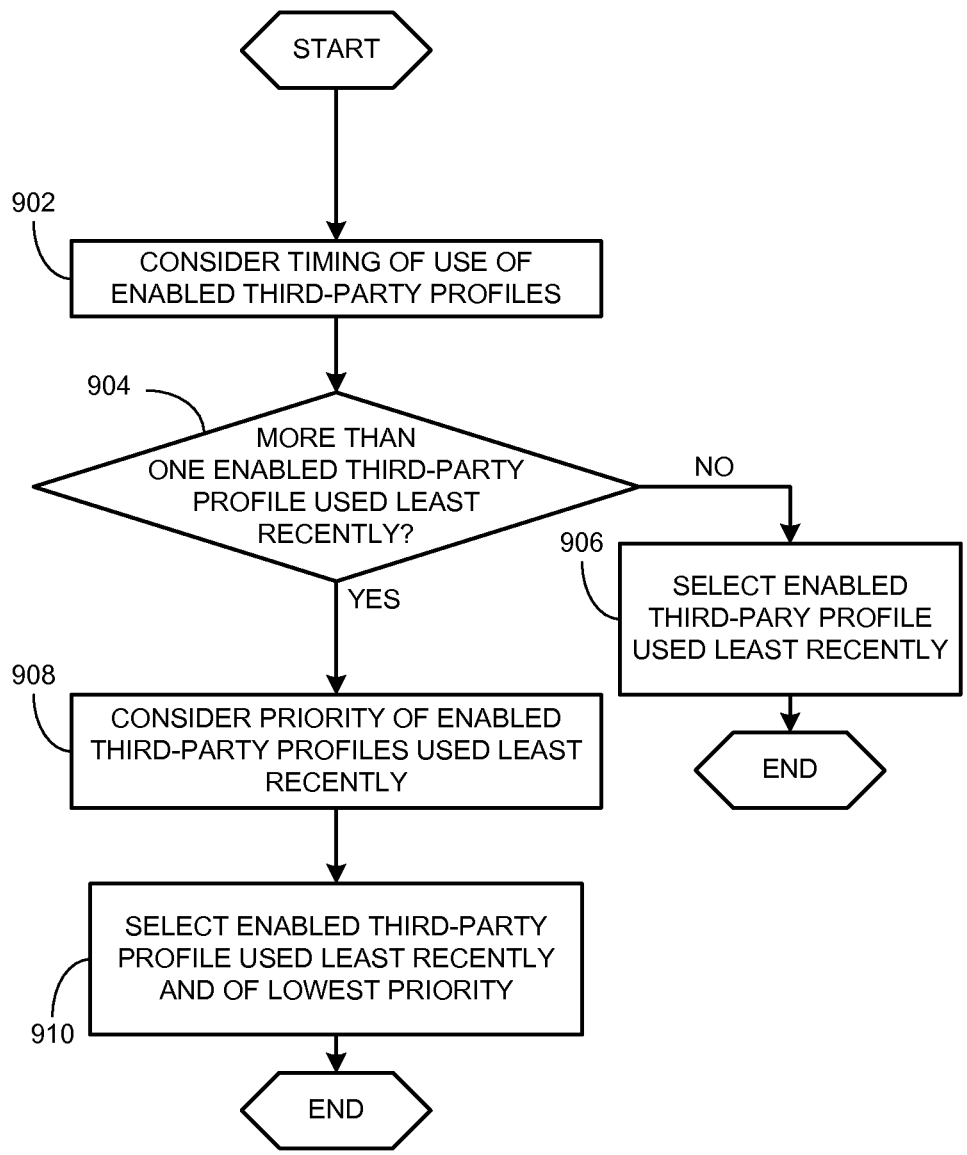
FIG. 13 is a flowchart illustration of an example method for automatically selecting an enabled third-party connection profile to disable.

FIG. 13 is a flowchart illustration of an example method for automatically selecting an enabled third-party connection profile to automatically disable. The method may be performed by wireless connection setup and connection profile management application 232, when executed by processor 202 of mobile station 200. The method is an example of what happens at 426 in the method illustrated in FIG. 7.

When the method begins, the candidates for disablement can be expressed as the set: {enabled third-party connection profiles}, and the set has many candidates, possibly equal to the maximum number of enabled connection profiles. The mobile station considers at 902 timing of use of the enabled third-party connection profiles. For example, the mobile station may identify, by comparing timestamps, which of the enabled third-party connection profiles was used least recently. It is contemplated that, due to re-initialization of the timestamps when the mobile station is restored from backup or is reset to default settings, that two or more connection profiles may have identical timestamps. At this point, the remaining candidates for disablement can be expressed as the following intersection: {enabled third-party connection profiles}∩{least recently used connection profiles}.

If, as checked at 904, there is only one enabled third-party connection profile used least recently, then the mobile station selects at 906 the enabled third-party connection profile used least recently as the enabled connection profile to be automatically disabled, and the method ends.

If, as checked at 904, there are two or more enabled third-party connection profiles used least recently, then the mobile station considers at 908 the priority of the remaining candidates. Thus the mobile station selects at 910 the enabled third-party connection profile used least recently that is of the lowest priority, and the method ends.

General Remarks Relating to Flowchart Illustrations and Block Diagrams

Some of these techniques are described in this document with reference to flowchart illustrations and/or block diagrams of methods, apparatus (systems) and computer program products. It will be understood that each block of the flowchart illustration and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create means for implementing the functions or actions specified in the flowchart illustration and/or block diagram block or blocks.

These computer program instructions may also be stored in a physical computer-readable medium that can direct a computer or other programmable data processing apparatus to function in a particular manner, such that the instructions stored in the computer-readable medium produce an article of manufacture including instruction means which implement the functions or actions specified in the flowchart illustration and/or block diagram block or blocks. Computer programs implementing the techniques described in this document can be distributed to users on a distribution medium such as a floppy disk, CD-ROM, or DVD, or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computing to act in accordance with the methods described in this document. All these operations are well-known to those skilled in the art of computer systems.

Each block of the flowchart illustrations and/or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending on the functionality involved. Each block of the flowchart illustration and/or block diagrams, and combinations of blocks in the flowchart illustrations and/or block diagrams, can be implemented by special purpose hardware-based systems that perform the specified functions or actions, or by combinations of special purpose hardware and computer instructions.

Although the subject matter has been described in language specific to structural features, methodological acts or both, it is to be understood that the subject matter defined in the appended claims is not necessarily limited to the specific features or acts described above. Rather, the specific features and acts described above are disclosed as example forms of implementing the claims.

What is claimed is:

1. A method of ensuring that the number of enabled connection profiles stored in a mobile station does not exceed a maximum the method comprising:
    while the number of enabled connection profiles stored in the mobile station is at the maximum:
        automatically selecting one of the enabled connection profiles; and
        automatically disabling the selected connection profile, thus reducing the number of enabled connection profiles by one,
        wherein automatically selecting one of the enabled connection profiles comprises:
    selecting an enabled user-created connection profile as the selected connection profile in the event that at least one enabled user-created connection profile is stored in the mobile station;
    selecting an enabled provisioned connection profile as the selected connection profile in the event that no enabled user-created connection profiles are stored in the mobile station and at least one enabled provisioned connection profile is stored in the mobile station; and
    selecting an enabled third-party connection profile as the selected connection profile in the event that no enabled user-created connection profiles are stored in the mobile station and no enabled provisioned connection profiles are stored in the mobile station.

2. The method as recited in claim 1, wherein selecting an enabled user-created connection profile takes into account, in the following order, (i) whether only one of the enabled connection profiles is a user-created connection profile; (ii) whether only one of the enabled user-created connection profiles was used least recently; (iii) whether only one of the enabled user-created connection profiles used least recently is of a designated security type; and (iv) a priority assigned to the enabled user-created connection profiles used least recently of the designated security type.

3. The method as recited in claim 1, wherein selecting an enabled provisioned connection profile takes into account, in the following order, (i) whether only one of the enabled connection profiles is a provisioned connection profile; (ii) whether only one of the enabled provisioned connection profiles was used least recently; (iii) whether only one of the enabled provisioned connection profiles used least recently is of a designated security type; and (iv) a priority assigned to the enabled provisioned connection profiles used least recently of the designated security type.

4. The method as recited in claim 1, wherein selecting an enabled third-party connection profile takes into account, in the following order, (i) whether only one of the enabled third-party connection profiles was used least recently; and (ii) a priority assigned to the enabled third-party connection profiles used least recently.

5. The method as recited in claim 1, further comprising:
after automatically disabling the selected connection profile, outputting a notification which connection profile was automatically disabled.

6. The method as recited in claim 1, further comprising:
after automatically disabling the selected connection profile, enabling a particular disabled connection profile that is not the selected connection profile, thus increasing the number of enabled connection profiles by one.

7. The method as recited in claim 6, wherein automatically selecting one of the enabled connection profiles, automatically disabling the selected connection profile, and enabling the particular disabled connection profile occur in response to receiving, while the number of enabled connection profiles stored in the mobile station is at the maximum, a request to enable the particular disabled connection profile.

8. The method as recited in claim 1, further comprising:
after automatically disabling the selected connection profile, saving a new connection profile of a wireless network as an enabled connection profile.

9. The method as recited in claim 8, wherein automatically selecting one of the enabled connection profiles, automatically disabling the selected connection profile, and saving the new connection profile of the wireless network occur in response to receiving, while the number of enabled connection profiles stored in the mobile station is at the maximum, a request to create the new connection profile of the wireless network.

10. A mobile station comprising:
a wireless network communication interface;
a processor coupled to the wireless network communication interface;
a memory coupled to the wireless network communication interface, the memory storing a driver for the wireless network communication interface, a wireless connection setup and connection profile management application, and an indication of a maximum number of enabled connection profiles,
the memory further able to store connection profiles,
wherein the wireless connection setup and connection profile management application, when executed by the processor, is operative while a number of enabled connection profiles stored in the mobile station is at the maximum number:
to automatically select one of the enabled connection profiles; and
to automatically disable the selected connection profile, thus reducing the number of enabled connection profiles by one,
wherein automatic selection of one of the enabled connection profiles comprises:
selection of an enabled user-created connection profile as the selected connection profile in the event that at least one enabled user-created connection profile is stored in the mobile station;
selection of an enabled provisioned connection profile as the selected connection profile in the event that no enabled user-created connection profiles are stored in the mobile station and at least one enabled provisioned connection profile is stored in the mobile station; and
selection of an enabled third-party connection profile as the selected connection profile in the event that no enabled user-created connection profiles are stored in the mobile station and no enabled provisioned connection profiles are stored in the mobile station.

11. The mobile station as recited in claim 10, wherein selection of an enabled user-created connection profile takes into account, in the following order, (i) whether only one of the enabled connection profiles is a user-created connection profile; (ii) whether only one of the enabled user-created connection profiles was used least recently; (iii) whether only one of the enabled user-created connection profiles used least recently is of a designated security type; and (iv) a priority assigned to the enabled user-created connection profiles used least recently of the designated security type.

12. The mobile station as recited in claim 10, wherein selection of an enabled provisioned connection profile takes into account, in the following order, (i) whether only one of the enabled connection profiles is a provisioned connection profile; (ii) whether only one of the enabled provisioned connection profiles was used least recently; (iii) whether only one of the enabled provisioned connection profiles used least recently is of a designated security type; and (iv) a priority assigned to the enabled provisioned connection profiles used least recently of the designated security type.

13. The mobile station as recited in claim 10, wherein selection of an enabled third-party connection profile takes into account, in the following order, (i) whether only one of the enabled third-party connection profiles was used least recently; and (ii) a priority assigned to the enabled third-party connection profiles used least recently.

14. The mobile station as recited in claim 10, further comprising:
a display coupled to the processor,
wherein the wireless connection setup and connection profile management application, when executed by the processor, is operative, after automatically disabling the selected connection profile, to output a notification which connection profile was automatically disabled.

15. The mobile station as recited in claim 10, wherein the wireless connection setup and connection profile management application, when executed by the processor, is operative, after automatically disabling the selected connection profile, to enable a particular disabled connection profile that is not the selected connection profile, thus increasing the number of enabled connection profiles by one.

16. The mobile station as recited in claim 15, wherein automatic selection of one of the enabled connection profiles, automatic disablement of the selected connection profile, and enablement of the particular disabled connection profile occur in response to receiving, while the number of enabled connection profiles stored in the mobile station is at the maximum, a request to enable the particular disabled connection profile.

17. The mobile station as recited in claim 16, further comprising:
a user input element coupled to the processor, the user input element operative to detect the request.

18. The mobile station as recited in claim 10, wherein the wireless connection setup and connection profile management application, when executed by the processor, is operative, after automatically disabling the selected connection profile, to save a new connection profile of a wireless network as an enabled connection profile.

19. The mobile station as recited in claim 18, wherein automatic selection of one of the enabled connection profiles, automatic disablement of the selected connection profile, and saving of the new connection profile of the wireless network occur in response to receiving, while the number of enabled connection profiles stored in the mobile station is at the maximum, a request to create the new connection profile of the wireless network.

20. The mobile station as recited in claim 19, further comprising:
a user input element coupled to the processor, the user input element operative to detect the request.

* * * * *